(12) United States Patent
Gotschlich

(10) Patent No.: US 9,445,079 B2
(45) Date of Patent: Sep. 13, 2016

(54) CALIBRATION OF A 3D CAMERA

(71) Applicant: Infineon Technologies AG, Neubiberg (DE)

(72) Inventor: Martin Gotschlich, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 378 days.

(21) Appl. No.: 13/772,372

(22) Filed: Feb. 21, 2013

(65) Prior Publication Data

US 2014/0232825 A1    Aug. 21, 2014

(51) Int. Cl.
| | | |
|---|---|---|
| *H04N 13/04* | (2006.01) |
| *H04N 5/225* | (2006.01) |
| *G06F 15/00* | (2006.01) |
| *H04N 13/02* | (2006.01) |
| *G01S 17/89* | (2006.01) |
| *G01S 7/497* | (2006.01) |
| *G06F 3/01* | (2006.01) |

(52) U.S. Cl.
CPC ........... *H04N 13/0246* (2013.01); *G01S 7/497* (2013.01); *G01S 17/89* (2013.01); *G06F 3/017* (2013.01)

(58) Field of Classification Search
CPC ......... H04N 13/04; H04N 5/225; G06F 3/02
See application file for complete search history.

(56) References Cited

U.S. PATENT DOCUMENTS

| | | | |
|---|---|---|---|
| 2007/0242137 A1* | 10/2007 | McKain et al. ......... | 348/207.99 |
| 2010/0231522 A1* | 9/2010 | Li ................... | 345/169 |
| 2012/0081522 A1* | 4/2012 | Friedman ................ | 348/51 |

* cited by examiner

*Primary Examiner* — Sath V Perungavoor
*Assistant Examiner* — Patricia I Young
(74) *Attorney, Agent, or Firm* — Harrity & Harrity, LLP

(57) ABSTRACT

A method for calibrating a 3D camera includes determining an actuation of an element by a person and calibrating the 3D camera based on the determining of the actuation.

26 Claims, 4 Drawing Sheets

CALIBRATION OF A 3D CAMERA

BACKGROUND

Three dimensional Depth-Cameras (3D cameras) which are for example based on the ToF principle (time-of-flight principle) or other principles provide a new technology field with many applications. To give only one of many applications, 3D cameras may provide human gesture recognition in natural user interfaces. Such 3D cameras may be for example used for mouse replacement in the cubic foot in front of a notebook computer. Distinguished from 2D cameras, 3D cameras provide an array of pixel to generate for each pixel information related to a distance of the object captured by the pixel. Such information may for example be based on a time of flight of light reflected from an object captured by the pixels, a geometrical relation of light points at the object captured by the pixels or other methods.

3D cameras require a calibration to provide reliable relative and absolute distance information. Such calibrations are typically made at the end test of the camera prior to shipping the 3D camera. It would be beneficial to have a new concept of calibration of 3D cameras which is easy to implement, provides a high degree of safety or reduces the calibration time at the end test of the camera.

DETAILED DESCRIPTION

Figure 1A:
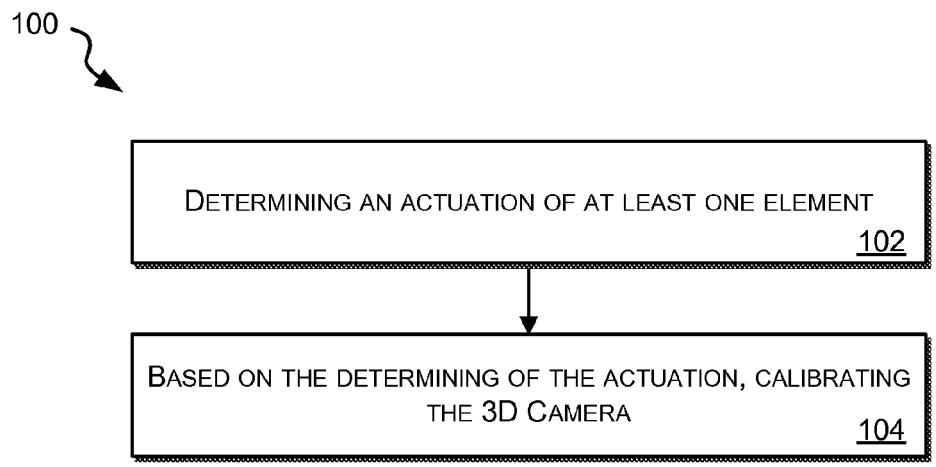
FIGS. 1A and 1B show flow chart diagrams according to embodiments.

The following detailed description explains example embodiments. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling unless specifically described otherwise. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number. Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

In the described embodiments, various specific views or schematic views of elements, devices, features, etc. are shown and described for a better understanding of embodiments. It is to be understood that such views may not be drawn to scale. Furthermore, such embodiments may not show all features, elements etc. contained in one or more figures with a same scale, i.e. some features, elements etc. may be shown oversized such that in a same figure some features, elements, etc. are shown with an increased or decreased scale compared to other features, elements etc.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The embodiments described below are directed to a new concept for calibrating a 3D camera. In the known art, the 3D camera typically undergoes a comprehensive calibration at the end test. All calibration steps of 3D cameras are therefore in the known art typically provided only once prior to the shipping of the 3D camera. A full calibration of the 3D camera may include calibrations like absolute distance per pixel, the absolute amplitude per pixel, the dependence of depth measurement on amplitude levels, an identification of dead pixels (out-of-spec-pixels), a shift of above parameters over temperature, a compensation of introduced errors of the optical system like errors in illumination, errors introduced in the lense system. The calibration may also address the so called wiggling error which may be appear in photon-mixing-devices based on the time-of flight principle. The wiggling effect is caused by a non-perfect modulation of the light, i.e. the amplitude modulation of the light transmitted to the object to be captured has neither a perfect rectangular nor a perfect sinusoidal shape. When a demodulation is done in the pixels of the photon mixing devices, this effect may cause errors in the phase information and therefore errors in the depth signal of the 3D camera As will be described below, with the herein described calibration, at least a part of the above described calibration processes can be shifted towards the final application where the calibration data is generated in real-time during operation of the 3D-camera. This allows to simplify or eliminate at all the calibration during camera production-test and allows saving test time and production cost at no or very little expenses. The calibration described in embodiments allows reducing the calibration time at the end testing of the device and therefore reducing manufacturing costs. The concept may provide real time calibration during operation of the electronic apparatus in which the 3D camera is mounted. Furthermore, the new calibration concept allows having repetitive calibration during operation of the apparatus. The calibration can be easily repeated during operation of the apparatus to provide increased security and confirmation of regular operation of the 3D camera. Furthermore, the calibration concept described herein allows the calibration at the final application when the 3D camera is mounted in the apparatus.

Referring now to FIG. 1A, a method 100 of calibrating a 3D camera according to an embodiment is described herein. The calibration starts at 102 with determining the actuation of at least one element. The element may in some embodiments include a manual actuation element like a key of a keyboard or a manual actuation button. In some embodiments, the element may include other types of elements such as touch screen panel or a specific region of a touch screen panel configured for actuation of certain functions etc. In some embodiments, the element may be an actuation element of the apparatus itself in which the 3D camera is mounted. For example, as will be described in FIG. 2, the 3D camera may be mounted in a portable computing device or Smartphone device and the element may be an element of the keyboard or a touch pad or a section of a touch screen of the device. In some other embodiments, the element may be a plug socket, a connector or jack into which specific connecting elements are to be plugged manually. To give a specific example, the element may be a headphone plug into which a headphone is plugged. In some embodiments, the element may be an element external to the apparatus in which the 3D camera is mounted as long as the 3D camera's view and position allows taking 3D information of the element.

With reference to 104, the 3D camera is then calibrated based on the determining of the actuation. Calibration may include at least one of the above described calibration processes for example a calibration of depth information such as an absolute distance information provided by the 3D cameras pixel array or a wiggling error.

Figure 1B:
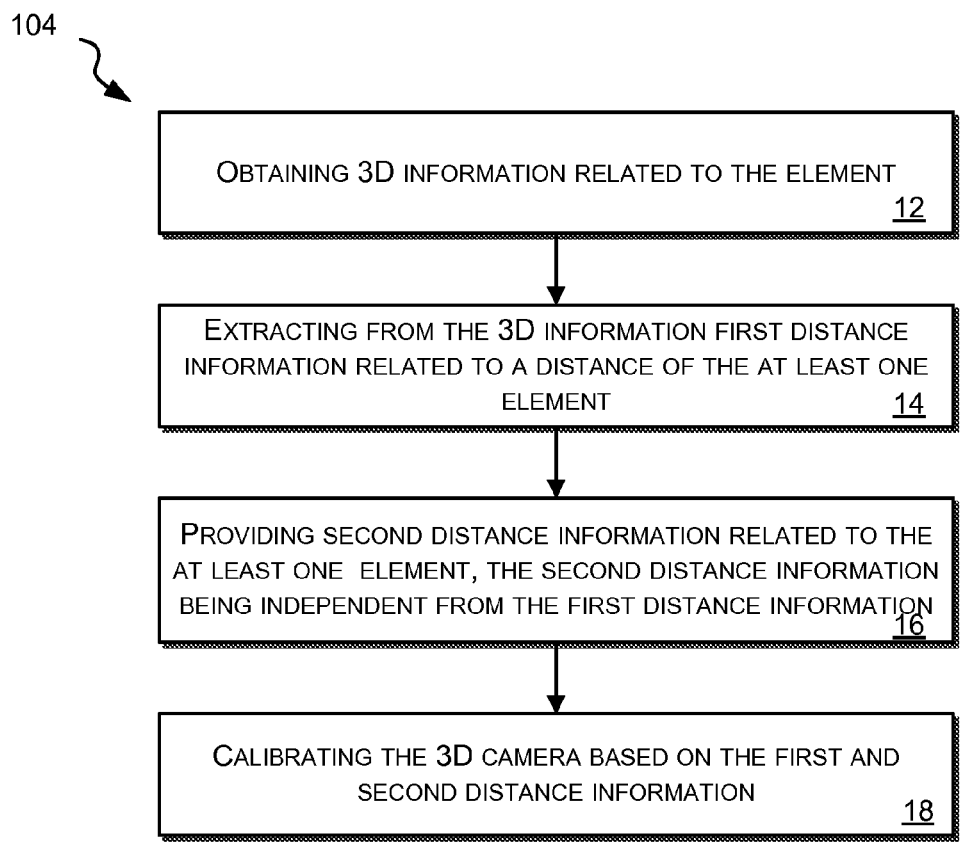

With reference to FIG. 1B, an example of the step referenced with 104 in FIG. 1A is described. The calibrating of the 3D camera starts at 12 with obtaining 3D information related to the element. 3D information may typically be provided in the form of digital frames containing distance information provided by each pixel of the cameras pixel array. However other forms or representation of 3D information may be used in other embodiments. The 3D information may be raw 3D information or may be 3D information after a digital filter processing. At 14, first distance information related to a distance of the at least one element is extracted from the 3D information. Extracting the distance information may include using a gesture control to identify within the 3D information a part of the human body such as an upper part of the user's finger which caused the actuation of the element.

At 16, second distance information related to the at least one element is provided. The second distance information is distance information which is obtained independent of the first information. In other words, the second distance information may be information which is not generated by the 3D camera but by any other method or means such as by geometrical considerations. The second distance information may be provided for example by using geometric relations which indicate a distance related to the element. For example, a geometrical triangulation method may be used to determine a distance between the at least one element and the camera. According to some embodiments, every method may be used which is not based on the 3D information provided by the 3D camera and allows obtaining reliable information on the at least one element's distance.

The distance between the element and the camera may in some embodiments be fixed and the distance information may be preprogrammed or prewritten in memory of the apparatus. In some embodiments, the distance between the at least one element and the 3D camera may be variable, for example due to a mounting of the 3D camera in a moveable or pivotable part of the apparatus, or a mounting of the at least one element in a moveable or pivotable part of the apparatus or both. Further, for example when the actuation is provided by a touch pad or touch screen, a position at which the touch pad element is shown and touched by the user may be variable dependent for example on a scaling etc. Nevertheless, the touch pad or touch screen can provide exact information for example by capacitive sensing of the location at which the touch pad was actuated by the user. Then, by using for example the above described geometrical relations, the distance between the location at which the user actuated the touch pad element and the 3D camera can be calculated.

Referring now to step 18 in FIG. 1B, the calibrating of the 3D camera is performed based on the first and second information. It is to be noted that the second information is considered to be the reliable information and one or more camera parameters may be adapted if the first distance information differs from the second distance information to match the 3D information provided by the 3D camera to obtain the value of the second distance information instead of the assumed defective first distance information. In the calibration process, some processing may be provided in order to filter out a systematic or temporarily error or unreliability of the second information. For example, a range of reliable values for the second information may be defined and the calibration may be performed only if the second information falls into this range.

While the method is described in a specific flow chart, it is to be understood that some steps may be interchanged without changing the above described concept.

The calibration described in embodiments uses specific reference points, for example a keyboard, touchpad or other input devices mounted in a well defined or calculatable position in relation to the camera and its field of view. At the moment in time when the input device is activated (e.g. one of the keys or buttons etc is pressed) and whenever this actuation is visible in the field of view of the camera, it may be used as distance reference for those pixel receiving the fingertip pushing the key down as the geometric distance between camera and all buttons on the keyboard is well defined. This process may be continuously performed throughout the normal operation of the apparatus and with each actuation of the at least one element or with an actuation within a specific time interval or based on a predetermined scheme. Such continuous re-calibration may compensate drift effects which may for example be caused by changing temperature or other environmental or non-environmental effects. The new concept can therefore provide an improved and continuous calibration over the full life cycle of the apparatus compared to the one-time calibration at the end testing of the known art.

It is to be noted that the 3D camera may in some embodiments be in a low power mode and may be instantaneously put into an operating mode based on the determining that the at least one element has been actuated in order to allow immediately the providing of the 3D information by the 3D camera at a moment when the user's finger is close to the element. In other embodiments, the 3D camera may be continuously active for example to allow tracking of human gestures of the user.

Figure 2:
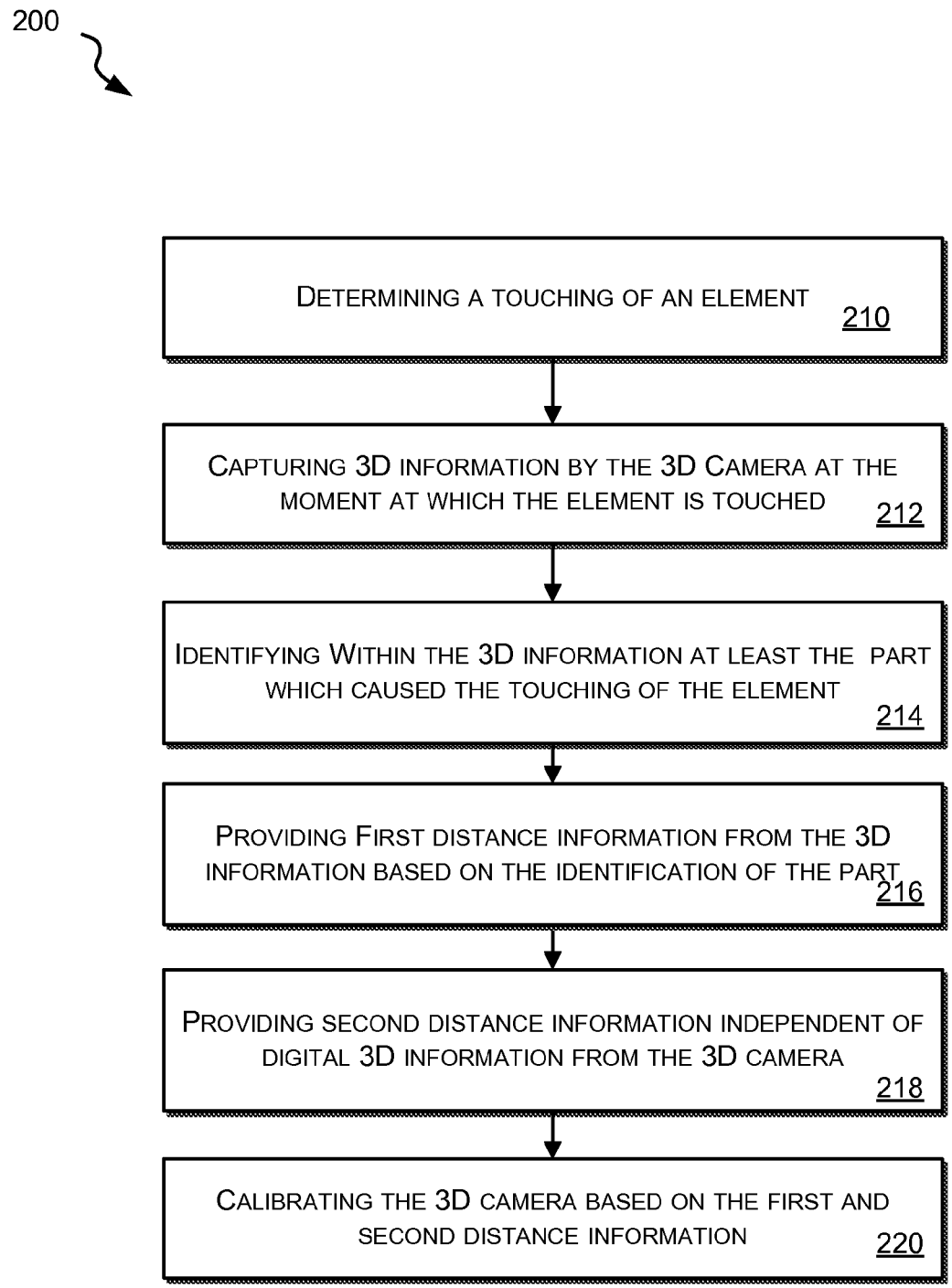
FIG. 2 shows a flow chart diagram according to an embodiment.

Referring now to FIG. 2, a further embodiment of a calibration method 200 will be described. The method starts at 210 with the determining that an element has been touched. At 212, 3D information at the moment at which the element is touched is captured by the 3D camera. It is to be noted that the moment at which the element is touched may also be a moment shortly after or before the exact moment of touching the element as long as the user's body part which touched the element is within a close region of the element at this moment in time. At 214, the user's body part which touched the element is identified within the 3D information. It is to be noted that also other non-human parts like a part of a connector hold by the user may be detected. Human gesture recognition processes which may be implemented in the 3D camera anyway to allow tracking of human gestures may be used or partly used to provide the identification for example of the user's finger or tip of the finger within the 3D information or other parts. Thus, the human gesture recognition can be reused during calibration to provide an additional synergetic effect for calibration.

At 216, based on the identified body part, first distance information is extracted from the 3D information. In some embodiments, the distance information may be distance information of a single pixel of the 3D camera pixel array, where the single pixel corresponds to the body part touching the element. In other embodiments, the distance information may correspond to distance information of a group of pixel arrays associated with a region of the user's body part or a region around the user's body part. In some embodiments, the distance information of the group of pixel may be processed to obtain the first distance information, for example by averaging the distance information generated by this group of pixel. Since the 3D information is captured at the moment when the user's body part touches the element, the distance of the body part can thus be assumed to be equal or almost equal to the distance of the element.

At 218, second independent distance information related to a distance between the element and the 3D camera is provided. The second distance information may be provided for example by reading a preset or pre-calculated value from a memory or by calculating in real time a distance based on a geometrical configuration of the 3D camera and the element. Finally, at 220, the calibration of the 3D camera is performed based on the first and second distance information. It is to be noted that the second distance information is considered to be reliable information for the calibration and therefore adaption of one or more 3D camera parameters may be made to match the captured 3D information at the time of touching to the value of the second distance information.

Figure 3:
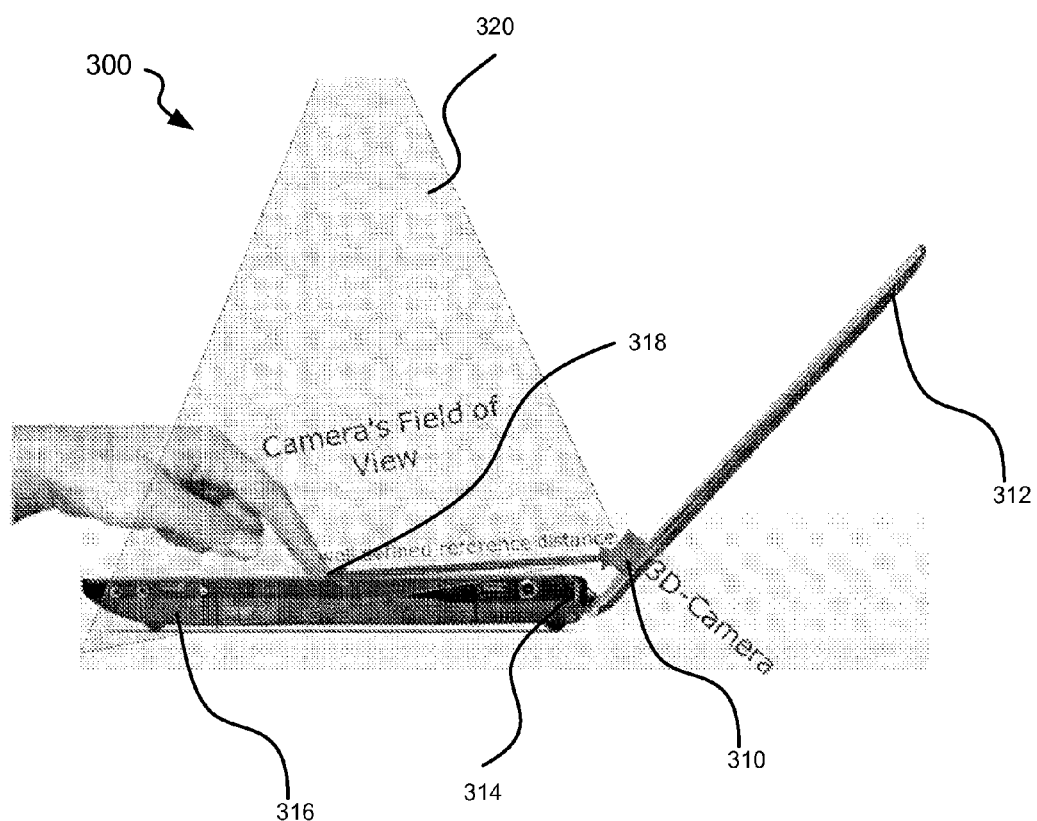
FIG. 3 shows a schematic drawing of an apparatus according to an embodiment.

Referring now to FIG. 3 an example of a portable computing apparatus 300 is shown in which the above described methods may be implemented.

FIG. 3 shows the portable computing apparatus 300 including a camera 310 mounted in a pivotable cover 312 of the apparatus 300. The cover 312 is capable to rotate around a pivot 314 provided in a body part 316 of the computing apparatus 300. Since a predetermined configuration exists in which the 3D camera has a fixed distance to the pivot 314 and a keyboard element 318 actuated by the user has a fixed distance to the pivot 314, a well defined reference distance is established between a keyboard element 318 actuated by the user and the 3D camera 312 for each pivot angle between the cover 312 and the body part 316. This distance can be calculated for example by determining the pivot angle and using geometrical calculations for the calibration. A wired or wireless connection between the keyboard element and an input of the camera may be established such that the 3D camera can receive signals from the keyboard element indicating the actuation of the element.

In some embodiments, a calibration of the camera's field of view 320 or other parameters may be performed in addition to the distance calibration. In such calibrations, information related to a 2D position (x-y-position) or 1D (x-position) of the pixel or pixels which capture the body part touching the element within the pixel array is provided. With this information calibration of the field of view or other optical or non-optical parameters may be performed.

Figure 4:
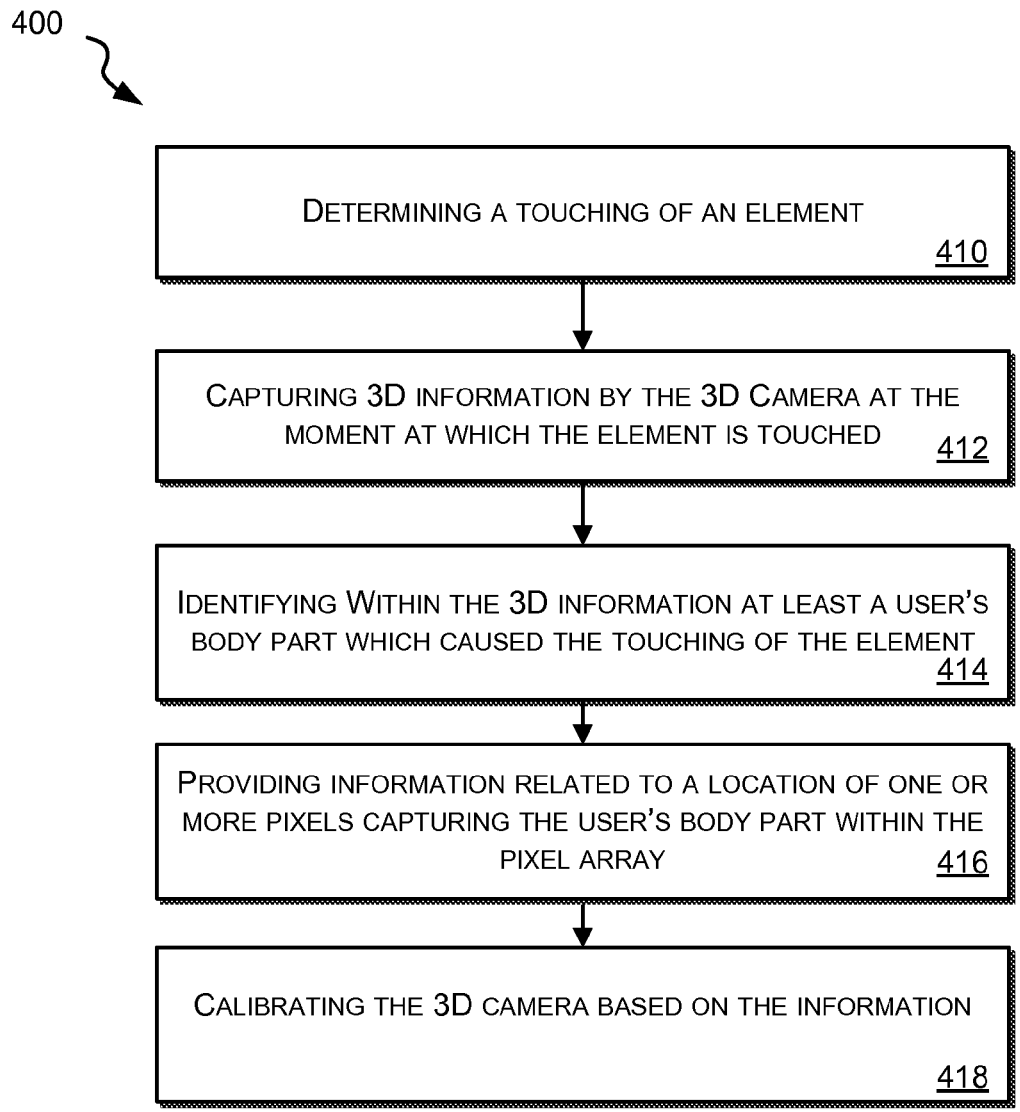
FIG. 4 shows a flow chart diagram according to an embodiment.

FIG. 4 shows a flow chart diagram of a method 400 addressing the calibration of a field of view or other parameters based on a pixel position.

At 402 a touching of the element is detected as has already been described above in more detail. At 412, 3D information is captured by the pixels of the 3D camera at the moment at which the element is touched. At 414, the part which caused the touching of the element is identified within the 3D information. At 416, information related to a location of one or more pixels capturing the part within the pixel array is provided. At 418 the 3D camera is calibrated based on the information related to a location of the one or more pixels. As described above, the parameters calibrated in 418 may include for example a field of view but also other optical or non-optical parameters including an optical distortion etc.

While some of the above embodiments describe recognition of a user's body part, other embodiments may include instead or additional thereto an identification of specific non-human parts which caused a touching or a contact with the element. For example, a headphone connector which is plugged in a headphone jacket may be identified and used for obtaining the reference distance for the calibration. It is to be understood that the gesture recognition processing can be easily adapted to perform such recognition processing of non-human parts if the specific form of these element is known or can be assumed.

It becomes clear from the above detailed description that the new calibration of 3D cameras described in embodiments is capable to provide a more reliable, easier, and cost-effective calibration of 3D cameras compared to the known art. Furthermore, since in some embodiments no information that a calibration is performed is presented to a person which caused the actuation of the element, intentional manipulation by a user can be avoided.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that— although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

Furthermore, it is intended to include in this detailed description also one or more of described features, elements etc. in a reversed or interchanged manner unless otherwise noted.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub steps. Such sub steps may be included and part of the disclosure of this single step unless explicitly excluded.

What is claimed is:

1. A method comprising:
   identifying, by a device, an actuation of at least one predetermined element associated with the device,
      the device being associated with a three-dimensional (3D) camera, and
      the at least one predetermined element including one of:
         an input component associated with the device, or
         an output component associated with the device;
   receiving, by the device and from the 3D camera, 3D information based on the identifying the actuation of the at least one predetermined element,
      the 3D information including 3D information related to the at least one predetermined element and captured by the 3D camera;
   identifying, by the device, the at least one predetermined element from the 3D information;
   extracting, by the device and from the 3D information, first distance information,
      the first distance information including a distance between the at least one predetermined element and the 3D camera;
   receiving, by the device, second distance information based on the identifying the at least one predetermined element,
      the second distance information including the distance between the at least one predetermined element and the 3D camera, as stored by the device or as calculated by the device,
      the second distance information being independent from the first distance information; and calibrating, by the device, the 3D camera based on the first distance information and the second distance information.

2. The method according to claim 1, wherein the 3D camera is mounted in the device, and
wherein the identifying the actuation of the at least one predetermined element and the calibrating the 3D camera are repeated during operation of the device.

3. The method according to claim 1, wherein the second distance information includes information that is not generated by the 3D camera.

4. The method according to claim 1, wherein the second distance information is stored in a memory associated with the device.

5. The method according to claim 1, wherein the identifying the actuation of the at least one predetermined element is based on identifying the actuation of the at least one predetermined element, independent from the 3D information captured by the 3D camera.

6. The method according to claim 1, wherein information associated with calibrating the 3D camera is not presented to a user that caused the actuation of the at least one predetermined element.

7. The method according to claim 1, wherein the second distance information is determined based on a predetermined configuration of the device and the 3D camera.

8. The method according to claim 7, wherein the predetermined configuration includes a first fixed distance between the 3D camera and at least one location of the device and a second fixed distance between the at least one predetermined element and the least one location of the device.

9. The method according to claim 7, wherein the predetermined configuration includes a predetermined distance between the 3D camera and the at least one predetermined element.

10. The method according to claim 9, wherein the 3D camera is mounted in a first part of the device and the at least one predetermined element is mounted in a second part of the device, and
wherein the predetermined distance is based on an angle between the first part of the device and the second part of the device.

11. The method according to claim 10, wherein the first part of the device is a cover of the device.

12. The method according to claim 1, wherein the identifying the at least one predetermined element from the 3D information includes:
identifying a body part, of a user associated with the device, that caused the actuation of the at least one predetermined element.

13. The method according to claim 1, wherein the at least one predetermined element includes an input element of the device, configured to allow input of information during operation of the device.

14. The method according to claim 1, further comprising:
determining a field of view of the 3D camera based on the actuation of the at least one predetermined element.

15. A device comprising:
a three-dimensional (3D) camera;
an input component to generate a signal indicating an actuation of the input component by a user of the device; and
one or more processors configured to:
receive the signal from the input component,
identify the actuation of the input component based on the signal,
receive, from the 3D camera, a 3D image of the input component,
the 3D image being captured by the 3D camera based on the signal,
identify the input component from the 3D image,
extract first distance information from the 3D image,
the first distance information including a distance between the input component and the 3D camera,
receive second distance information based on the identifying the input component,
the second distance information including the distance between the input component and the 3D camera, as stored by the device or as calculated by the device,
the second distance information being independent from the first distance information, and
calibrate the 3D camera based on first distance information and the second distance information.

16. The device according to claim 15, wherein the 3D camera is mounted in the device, and
wherein the one or more processors as configured to:
receive the signal from the input component each time the input component is actuated.

17. The device according to claim 15, wherein, when calibrating the 3D camera, the one or more processors are configured to:
calibrate an absolute distance and a wiggling error of the 3D camera based on the first distance information and the second distance information.

18. The device according to claim 15, wherein, when identifying the actuation of the input component, the one or more processors are configured to:
identify the actuation of the input component independent from the 3D image captured by the 3D camera.

19. The device according to claim 15, wherein information associated with calibrating the 3D camera is not presented to the user.

20. The device according to claim 15, wherein the second distance information is determined based on a predetermined configuration of the device and the 3D camera.

21. The device according to claim 20, wherein the predetermined configuration includes a first fixed distance between the 3D camera and at least one location of the device and a second fixed distance between the input component and the at least one location of the device.

22. The device according to claim 21, wherein the predetermined configuration includes a predetermined distance between the input component and the 3D camera.

23. The device according to claim 22, wherein the 3D camera is mounted in a first part of the device and the input component is mounted in a second part of the device, and
wherein the predetermined distance is based on an angle between the first part of the device and the second part of the device.

24. The device according to claim 23, wherein the first part of the device is a cover of the device.

25. The device according to claim 15, wherein, when identifying the input component from the 3D image, the one or more processors are configured to:
identify, from the 3D image, a body part of the user that caused the actuation of the input component.

26. The device according to claim 15, wherein the one or more processors are further configured to:
determine a field of view of the 3D camera based on the actuation of the input component.

* * * * *